July 3, 1962 V. R. ABRAMS ET AL 3,041,958
METHOD AND APPARATUS FOR CONTROLLING PROCESSING TEMPERATURES
Filed March 6, 1956
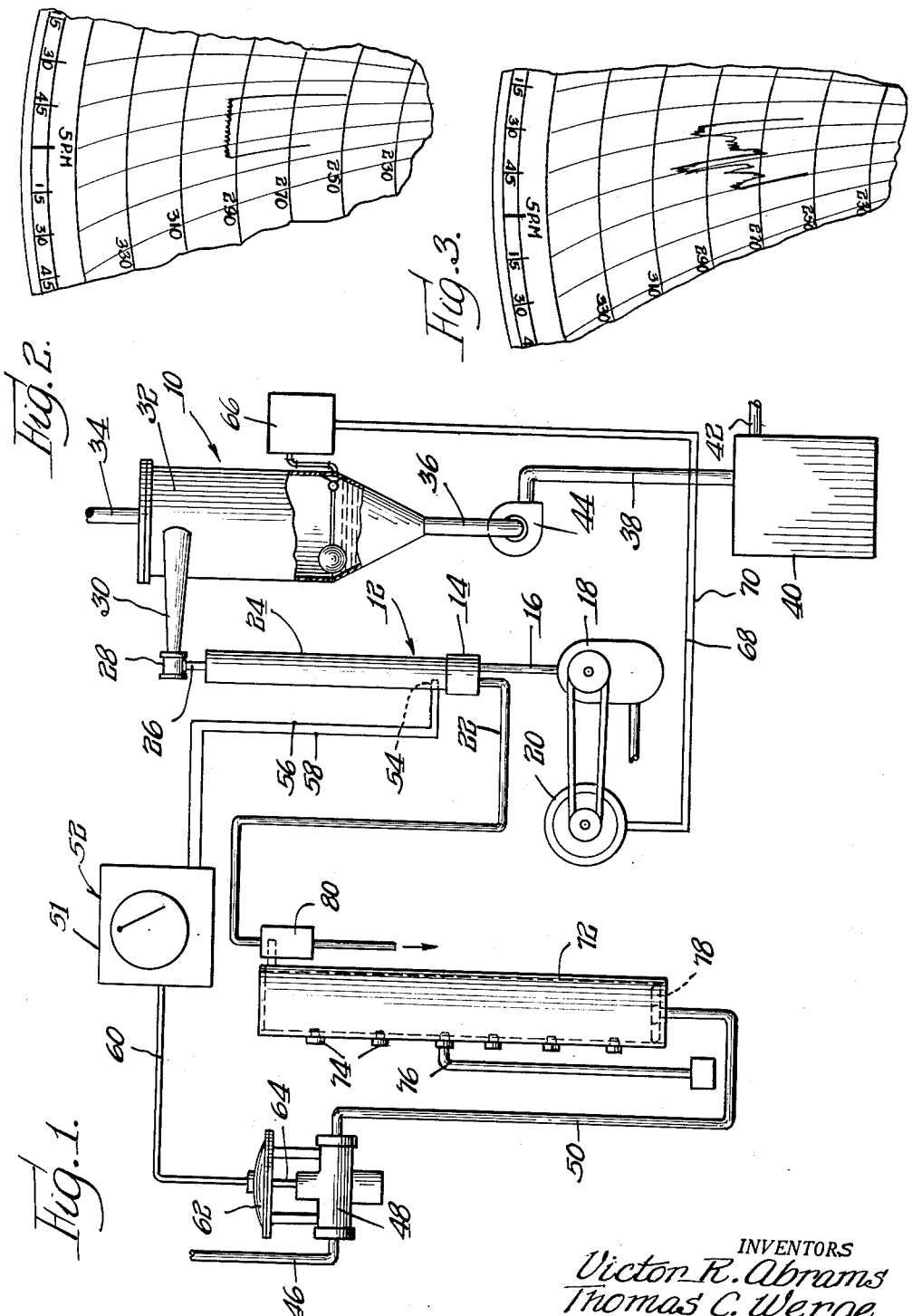
INVENTORS
Victor R. Abrams
Thomas C. Werge
James F. Ryan, Jr.
By: Olson & Trexler Attys.

United States Patent Office 3,041,958
Patented July 3, 1962

3,041,958
METHOD AND APPARATUS FOR CONTROLLING PROCESSING TEMPERATURES
Victor R. Abrams, Rockford, Ill., and Thomas C. Werge, Hayward, and James F. Ryan, Jr., Castro Valley, Calif., assignors to W. F. and John Barnes Company, Rockford, Ill., a corporation of Illinois
Filed Mar. 6, 1956, Ser. No. 569,874
11 Claims. (Cl. 99—251)

The present invention relates to a novel method and apparatus for processing a product flowing through the apparatus by heating the product with a fluid such as steam, and more particularly to a novel method and apparatus for controlling the processing temperature.

It will become apparent that the method and apparatus of the present invention may be utilized for processing products of various types and kinds, but in order to facilitate the present disclosure, the invention will be described as it particularly relates to the processing of fluid products such as food products by mixing steam with the liquid product in the manner fully disclosed in the co-pending application Serial No. 480,394, filed January 7, 1955, by Victor R. Abrams, now Patent No. 2,909,985, issued October 27, 1959. In this co-pending application there is disclosed an apparatus whereby steam is introduced through an injection head into and is condensed in a liquid product delivered to the injection head by a pump and thereafter the liquid product and condensed steam is passed through a temperature holding chamber to a suitable point of discharge. The apparatus disclosed in the above mentioned co-pending application is highly satisfactory for many products when known procedures and devices are used for controlling the processing temperature. However, when certain products such as milk or cream products are to be processed, it is necessary that the processing temperature be accurately controlled within narrow limits in order to avoid either injury to the product or inadequate processing, and it has been found that this necessary control cannot be adequately obtained by heretofore known procedures or commercially available control devices. It is, therefore, an important object of the present invention to provide a novel method and system whereby the temperature of a product being processed may be continuously and accurately maintained within pre-determined relatively narrow limits.

A more specific object of the present invention is to provide a novel method and apparatus for heating and processing a product by means of a heated fluid such as steam, which method and apparatus enables the processing temperature to be continuously and accurately controlled in an efficient yet simple and economical manner.

Another object of this invention is to provide a method and apparatus of the above described type whereby any contaminating material carried by the steam from the boiler or the like is removed prior to introduction of the steam into the product so as to prevent contamination of the product.

Other objects and advantages of the present invention will become apparent from the following description and the accompanying drawings wherein:

FIG. 1 is a schematic view showing an apparatus embodying the principles of the present invention;

FIG. 2 is a fragmentary view of a chart showing the accurate and constant control of temperature obtained in a fluid sterilizing apparatus using the control system of this invention; and FIG. 3 is a fragmentary view of a chart similar to FIG. 2 but illustrating the manner in which the temperature irregularly fluctuates when a control system not including the novel feature of the present invention was used.

As shown in the drawings, an apparatus 10 constructed in accordance with the present invention comprises a product receiving device 12 which may include an injection head into which the product is forced and mixed with a processing fluid such as steam. The product is delivered to the injection head through a conduit 16 by a pump 18, which pump is driven by a motor 20. The processing fluid is delivered to the injection head through a conduit 22. The processing fluid or steam condenses as it is mixed with the liquid product in the injection head, and a mixture of the product and condensate passes through an elongated and insulated tube 24 so that the mixture is held at a processing temperature for a period of time. The details of the device 12 need not be specifically set forth herein since they form no part of the present invention, but for a complete disclosure of an apparatus which may be used for the device 12, reference is hereby made to the above mentioned co-pending application filed by Victor R. Abrams.

The processed fluid passes from the holding tube or chamber 24 through an outlet conduit 26 and a back pressure valve 28. The back pressure valve serves to maintain the fluid within the processing device 12 under a predetermined pressure which, for example, may be such as to prevent the condensed steam from boiling or vaporizing. From the back pressure valve, the fluid passes through a nozzle 30 into a cooling and separating chamber 32 having an exhaust conduit 34 connected with a suitable source of reduced pressure. In the chamber 32, any excess condensate is vaporized and discharged through the conduit 34 and the remaining fluid or liquid product is cooled and collects in the bottom of the chamber. The collected liquid product is discharged through an outlet conduit 36 to any desired point, and may, for example, pass through a conduit 38 into a constant volume homogenizing pump 40 and then through a conduit 42 to a container filling apparatus, not shown. Preferably, a booster pump 44 is provided between the outlet conduit 36 and the pump 40.

The processing fluid or steam is delivered from a suitable source of supply such as a boiler, not shown, through a conduit 46, a control valve 48, and a conduit 50 to the above mentioned conduit 22 in the manner to be described below. The valve 48 is adjustable to control the rate of steam flow therethrough and the pressure of the steam delivered to the processing device 12 so as to control the temperature within the device 12. A controller 52 of known construction is provided for adjusting the valve 48, which controller may be of the type including a device 51 responsive to a thermocouple 54 electrically connected thereto by wires 56 and 58 and disposed in the processing device 12 and operable to control air pressure in a line 60 connected with expandable means 62. A valve stem 64 is connected with the expandable means so that the valve is positioned in accordance with variations in the air pressure within the line 60 and the expandable means 62. The rate at which the fluid product is delivered to the processing device 12 is preferably adjusted in accordance with the rate at which the product is removed from the cooling chamber 32, and in order to accomplish this, a float-type controller 66 of known construction is associated with the cooling chamber 32 for responding in accordance with the level of the liquid within the container. The controller 66 is electrically connected by wires 68 and 70 to the variable speed motor 20 so that the speed of the motor and, therefore, the delivery of the pump 18 is adjusted in accordance with the level of the liquid in the chamber 32.

A change in the processing temperature may arise as a result of a number of causes such, for example, as a change in the back pressure, a change in the volume or temperature of the fluid product feed, a change in the quantity of the steam, or a change in the boiler pressure.

A change in the processing temperature will institute an attempt by the controller 52 to adjust the valve 48 for the new condition, but rapid and accurate control is hindered by such factors as lag in thermocouple response, lag in the controller response and lag in and overshooting of the valve. When, as here, the thermal capacitance of the injection head of the device 12 is small, movements of the valve 48 should be small to prevent overcontrolling. If the controller 52 which is preferably of the proportional-plus-reset type is desensitized or adjusted for a wide proportional band and low reset, the time lag between the initial change in the processing temperature and the return of the temperature to a controlled valve may be several minutes. Furthermore, the temperature may vary several degrees in either or both directions so that for many products such as milk or cream, there is no adequate control. If, on the other hand, the controller is operated in a sensitive condition or with a narrow proportional band plus reset, the valve is overcontrolled and the temperature rises and falls rhythmically so that a hunting condition exists.

It has been found that the above mentioned control problems may be overcome and rapid, accurate and stable control of the processing temperature may be obtained in the manner now to be described. A reservoir 72 is connected between the steam lines 50 and 22, which reservoir is adapted to be partially filled with water. A plurality of openings are provided in vertically spaced relationship in the wall of the reservoir 72, which openings are normally closed by plugs 74, and a drain 76 is selectively connected with one of the openings so as to maintain the desired water level within the reservoir. Steam from the line 50 is introduced tangentially into the bottom of the reservoir 72 through a perforated cross or the like 78 so that the steam bubbles up through the water and is washed and desuperheated. In the event the steam has carried contaminating material from the boiler, the washing action eliminates such material from the steam ultimately introduced into the product being processed. It should be noted that the reservoir 72 is located between the valve 48 and the processing device 12 so that a controlled pressure is maintained between the valve and the injection head 14 and in the reservoir 72. Thus, the water in the reservoir or accumulator 72 is heated and maintained at a temperature corresponding to the temperature of steam at a pressure required for injection into the head 14. Therefore, as steam is introduced into and is condensed in the body of water in the accumulator 72, other steam evaporates above the water and passes out through a separator 80 and into the pipe 22.

It has been found that as a result of the relatively large thermal capacity of the accumulator 72, the accumulator acts as a "thermal flywheel" and serves to smooth out changes in the steam flow resulting from adjustments of the valve 48. Therefore, a valve movement which would have resulted in overcontrol before the introduction of the accumulator 72 into the system, now will result in rapid control of the processing temperature within the limits desired. The effectiveness of the control system utilizing the thermal accumulator or "thermal flywheel" has been demonstrated by operating the apparatus with the controller 52 functioning at relatively low proportional bands ranging between 2–15 and with a reset of two. Under these conditions, controller and output recorders drew a line well within an envelope of 2°, and when the entering feed stock temperature was abruptly changed from 170° Fahrenheit to 65° Fahrenheit, total deflection on the controller chart was about 6° and set temperature was restored in less than thirty seconds. Furthermore, it was found that changes in steam pressure of as much as 20 p.s.i. have no apparent effect on the processing temperature nor do changes in the stock feed rate or back pressure within operating conditions. For a graphic illustration of the effectiveness of the temperature control obtained in accordance with this invention, reference is made to the charts shown in FIGS. 2 and 3 which are approximate copies of portions of charts actually made during test runs. The line drawn on the chart in FIG. 2 indicates the temperature of the product in the device 12 and shows how the temperature was maintained within a range of two degrees when the control system included the "thermal flywheel." FIG. 3 shows how the temperature fluctuated substantial irregular amounts when the apparatus was operated without the "thermal flywheel."

While the preferred embodiment of the present invention has been shown and described herein, it is obvious that many structural details may be changed without departing from the spirit and scope of the appended claims.

The invention is claimed as follows:

1. An apparatus for processing a product comprising means for receiving stock material, means for directing processing steam at a given temperature through said first mentioned means in intimate contact with stock material contained therein, means responsive to the temperature of the stock material for controlling flow of the processing steam to said first mentioned means, and thermal accumulator means providing a portion of said processing steam directing means between said first mentioned means and said controlling means for effectively smoothing out changes in the flow of processing steam.

2. An apparatus for processing a fluid product comprising means for receiving a flow of a fluid product, means for delivering heated processing steam to said first mentioned means for intimately contacting and heating the fluid product to a processing temperature, means responsive to the fluid product temperature for controlling delivery of the processing steam, and thermal accumulator means providing a portion of said delivery means between said first mentioned means and said control means for smoothing out variations in processing steam flow.

3. An apparatus for processing a fluid product comprising means for receiving a flow of a fluid product, means for delivering steam to said first mentioned means for intimately contacting and heating the fluid product to a processing temperature, means responsive to the fluid processing temperature for controlling flow of steam to said first mentioned means, and thermal accumulator means containing a body of water providing a portion of said delivery means between said first mentioned means and said control means for smoothing out variations in the steam flow.

4. An apparatus for processing stock material, comprising means for receiving a quantity of stock material, means for injecting processing steam into the stock material in said first mentioned means for bringing said stock material to a processing temperature, means responsive to the temperature of the stock material in said first mentioned means for controlling flow of processing steam to said injection means, and means for supplying the processing steam to the injecting means including thermal accumulator means containing a body of water connected between said injection means and said control means for smoothing out any variations in the processing steam flow.

5. An apparatus for processing fluid material comprising means for receiving a flow of fluid material, conduit means extending between said first mentioned means and a source of steam for directing steam into the fluid material contained within said first mentioned means to heat the fluid material to a processing temperature, control means including a valve connected in said conduit means and means responsive to the fluid product temperature for controlling the flow of steam to said first mentioned means, and thermal accumulator means including a reservoir containing a body of water providing a portion of said conduit means between said valve and said first mentioned means for smoothing out the effect of any change in the steam flow.

6. An apparatus for processing a fluid material comprising means for receiving a flow of fluid material, means for delivering a flow of fluid material under pressure to said first mentioned means, means adjacent an outlet of said first mentioned means for substantially maintaining a predetermined back pressure in said first mentioned means, conduit means connected with said first mentioned means for directing steam from a source of supply to said first mentioned means for intimately contacting and heating the fluid product to a processing temperature, means for controlling flow of steam through said conduit means including adjustable valve means connected in said conduit means and means responsive to the fluid material temperature for adjusting said valve means, and thermal accumulator means for smoothing out any variations in the steam flow through said conduit means, said accumulator means including a reservoir partially filled with water providing a portion of said conduit means between said first mentioned means and said valve, said reservoir having a steam inlet below the level of water therein and a steam outlet above the water level.

7. An apparatus for processing milk products or the like comprising means for receiving a flow of milk products, pump means for delivering a flow of milk products under pressure to said first mentioned means, back pressure valve means connected with an outlet of said first mentioned means for substantially maintaining a predetermined back pressure in said first mentioned means, expansion and cooling chamber means connected with an outlet of said back pressure valve means, a substantially constant volume homogenizing pump connected with an outlet of said chamber means for withdrawing and homogenizing the milk product accumulated in said chamber means, means responsive to any change in the volume of any milk product accumulated in said chamber means for varying the delivery rate of said milk product delivery pump means, conduit means connected with said first mentioned means for delivering steam from a source of supply and injecting the steam into the milk product, means including an adjustable valve connected in said conduit means and means responsive to the temperature in said first mentioned means for adjusting said valve means for controlling the rate of steam flow through said conduit means, and thermal accumulator means providing a portion of said conduit means between said first mentioned means and said valve means for smoothing out any variations in the rate of steam flow, said accumulator means comprising a reservoir containing a body of water through which the steam is passed.

8. An apparatus for processing a fluid material comprising means having a predetermined thermal capacity for receiving a flow of a fluid material and a flow of heated processing steam, means for directing the processing steam to said first mentioned means in intimate contact with fluid material contained therein, means responsive to the temperature within said first mentioned means for controlling delivery of the processing steam, and thermal accumulator means having a relatively high thermal capacity as compared with said predetermined thermal capacity providing a portion of said processing steam directing means between said first mentioned means and said control means for smoothing out the effects of any variation in the flow of a processing steam.

9. An apparatus for processing a product comprising means for receiving stock material, means for directing processing steam at a given temperature intimately through the stock material contained in said first mentioned means, means responsive to the temperature of the stock material for controlling flow of the processing steam to said first mentioned means, and means providing a portion of said steam directing means for washing the steam, and for providing a thermal accumulator for effectively smoothing out changes in the flow of processing steam.

10. An apparatus for processing a fluid material comprising means for receiving a flow of fluid material to be processed, means for directing processing steam to said first mentioned means and for injecting the processing steam into the fluid to be processed in said first mentioned means, means responsive to temperature within said first mentioned means for controlling delivery of the processing steam, and thermal accumulator means providing a portion of said steam directing means separate from said first mentioned means so that said processing steam will flow into and out of said accumulator means and then into said first mentioned means, said accumulator means being located between said first mentioned means and said control means for smoothing out the effects of any variation in the flow of the processing steam.

11. An apparatus for heat processing a fluid product comprising means for receiving a flow of a fluid product, means for delivering vaporized processing steam to said first mentioned means for intimately contacting and heating the fluid product to a processing temperature, means responsive to the fluid product temperature for controlling delivery of the processing steam, and means including a quantity of water flowpathwise disposed between said first mentioned means and said control means and maintained at said processing temperature by the vaporized processing steam entering therein, said quantity of water having a large total thermal capacity for time-averaging the heat carried to said product by said processing steam.

References Cited in the file of this patent
UNITED STATES PATENTS

| | | |
|---|---|---|
| 1,819,023 | Grindrod | Aug. 18, 1931 |
| 1,863,786 | Feldmeier | June 11, 1932 |
| 1,927,649 | Noack | Sept. 19, 1933 |
| 1,973,531 | Jacobsen | Sept. 11, 1934 |
| 2,019,491 | Grindrod | Nov. 5, 1935 |
| 2,130,644 | Hammer et al. | Sept. 20, 1938 |
| 2,222,575 | Schutte | Nov. 19, 1940 |
| 2,442,281 | Arant | May 25, 1948 |
| 2,498,836 | Cross | Feb. 28, 1950 |
| 2,549,575 | Conley | Apr. 17, 1951 |
| 2,625,488 | Wasserman et al. | Jan. 13, 1953 |
| 2,631,103 | Kermer | Mar. 10, 1953 |
| 2,644,758 | Cross | July 7, 1953 |
| 2,846,320 | Wittwer | Aug. 5, 1958 |